United States Patent
Malmberg

(10) Patent No.: US 6,619,469 B2
(45) Date of Patent: Sep. 16, 2003

(54) SCRAPER BLADE, ESPECIALLY CONVEYOR BELT SCRAPER

(75) Inventor: Mats Anders Malmberg, Rydsgård (SE)

(73) Assignee: Svedala Trellex AB, Trelleborg (SE)

( * ) Notice: Subject to any disclaimer, the term of this patent is extended or adjusted under 35 U.S.C. 154(b) by 23 days.

(21) Appl. No.: 09/972,835

(22) Filed: Oct. 5, 2001

(65) Prior Publication Data

US 2003/0066737 A1 Apr. 10, 2003

(30) Foreign Application Priority Data

Oct. 3, 2001 (SE) .............................. 0103292

(51) Int. Cl.$^7$ .............................. B65G 45/00
(52) U.S. Cl. ...................... 198/497; 198/499
(58) Field of Search ................ 198/499, 497

(56) References Cited

U.S. PATENT DOCUMENTS

| | | |
|---|---|---|
| 4,658,949 A | 4/1987 | Reicks |
| 5,197,587 A | 3/1993 | Malmberg |
| 5,647,476 A | 7/1997 | Veenhof ............... 198/497 |
| 5,865,294 A * | 2/1999 | Betz ..................... 198/497 |
| 5,944,167 A * | 8/1999 | Brink ................... 198/497 |
| 5,975,281 A * | 11/1999 | Yoshizako et al. ...... 198/499 |
| 6,082,524 A | 7/2000 | Brink |
| 6,349,816 B1 * | 2/2002 | Tenzer et al. .......... 198/497 |
| 6,374,991 B1 * | 4/2002 | Swinderman .......... 198/499 |
| 6,401,911 B1 * | 6/2002 | Swinderman .......... 198/499 |

FOREIGN PATENT DOCUMENTS

| | | |
|---|---|---|
| DE | 41 21 173 A1 | 2/1992 |
| DE | 195 08 090 A1 | 9/1993 |
| EP | 0 573 688 | 6/1992 |
| EP | 0 566 486 | 4/1993 |
| EP | 0 893 376 | 7/1998 |
| GB | 1 454 763 | 12/1974 |
| SE | 468 390 | 1/1992 |

* cited by examiner

Primary Examiner—Christopher P. Ellis
Assistant Examiner—Richard Ridley
(74) Attorney, Agent, or Firm—Kinney & Lange, P.A.

(57) ABSTRACT

A scraper blade has at one end a scraper tip and at the other end a mounting base. The scraper tip is outwardly tapered. The scraper blade has at least two layers of different materials. The layer of material which is facing forward, i.e. that first meets the surface to be scraped, and which is adapted to form the actual scraper tip is made of a material which is both softer and more abrasion resistant that said other layer.

20 Claims, 5 Drawing Sheets

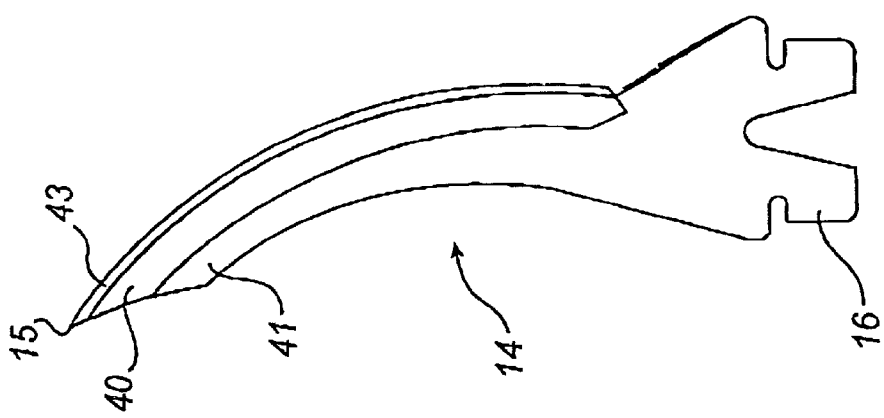
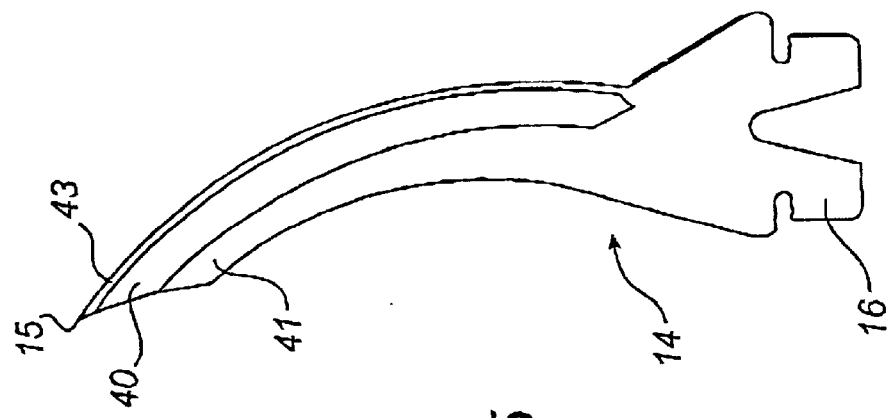
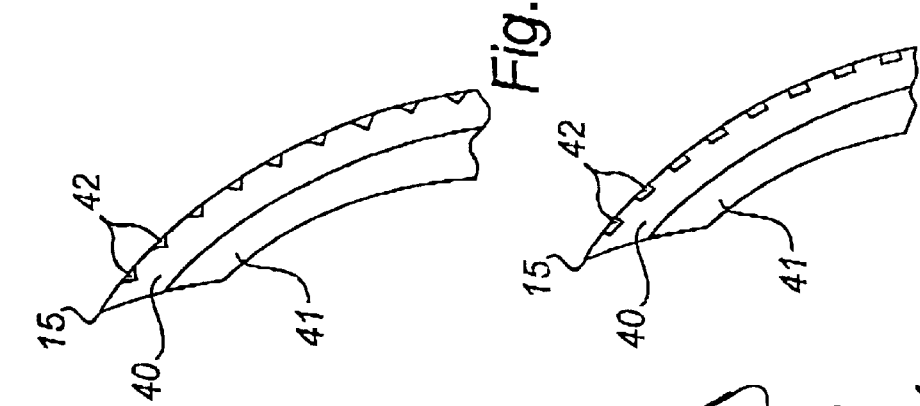
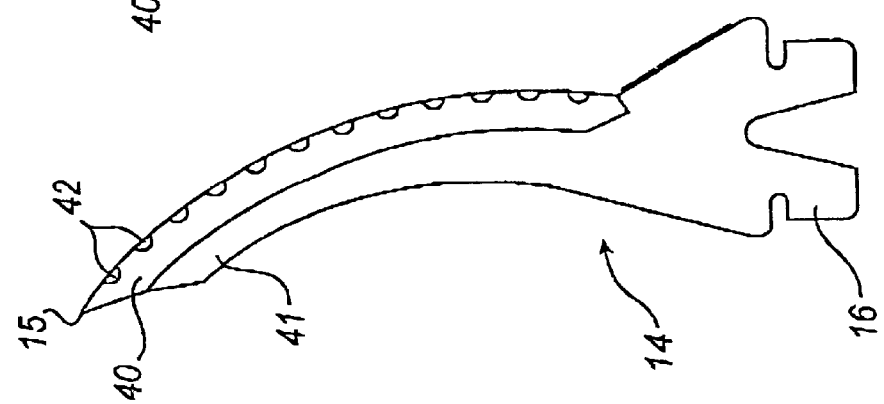

SCRAPER BLADE, ESPECIALLY CONVEYOR BELT SCRAPER

The present invention relates to a scraper blade for use, in particular, as a conveyor belt scraper.

SE-B-468390, and the corresponding U.S. Pat. No. 5,197,587, disclose a scraper blade adapted to be used in a conveyor belt scraping device. The scraper is made of a homogeneous elastomeric or plastic material and provided with an inner stiffening member in the form of a piece of sheet-metal which is inserted into a groove in the scraper. The abrasion resistance of this type of homogeneous scraper has proven to be insufficient for certain applications.

A similar scraper is disclosed in EP-A-0893376. This scraper has an inner stiffening member equivalent to the removable stiffening member of the scraper according to the above-mentioned specification. In other ways, the scraper is similar, i.e. the active scraper tip is made of a homogeneous material. Consequently, nor is this scraper optimal for said applications.

EP-A-0573688 also discloses a conveyor belt scraper having a tip which is made of a homogeneous material and which, during use, is subject to substantial abrasive wear and, therefore, is removably mounted.

Various proposals to increase the abrasion resistance have been put forward. Some of these are disclosed in U.S. Pat. No. 6,082,524, EP-A-0566486 and U.S. Pat. No. 5,692,595, where the tip of the scraper has been provided with an inset of cemented carbide. However, this solution causes unnecessary wear on the surface scraped by the scraper.

GB-A-1454763 discloses a scraper blade which is made of a two-layer laminate, in which one layer is made of an elastomeric material of a softer quality to achieve efficient scraping and the other layer is of a harder quality to form a support for the softer layer. In use, the scraper blade can be mounted in such manner that the harder layer is facing forward or that the softer layer is facing forward. The latter mounting is preferred when the scraper is used for scraping wet materials. In the embodiment shown, the scraper blade is arranged perpendicularly to the surface to be scraped. If the scraper is used as a prescraper to scrape an arched surface and, therefore, the scraper blade is applied obliquely against this surface, there is a considerable risk of the layer of soft material forming a thin lip, which does not come off and thus has a detrimental effect on the scraping result.

The latter problem has been observed in U.S. Pat. No. 4,658,949, which provides another way of maintaining an essentially constant scraper tip, i.e. of preventing the outer end of the pointed scraper from bending outwards from the scraped surface, which would otherwise lead to a complete or partial loss of scraping ability. This prior-art technique is based on the idea that the outside of the scraper is provided with fracture lines in the form of section lines or thin slits, which extend a considerable distance into the scraper from its outside so that the tip, after being worn to a given depth, simply breaks off, thus revealing a new efficient scraper tip portion. One disadvantage of this prior-art construction is that the fracture lines weaken the scraper and give the new tip a blunt shape.

An object of the present invention is to provide a new scraper blade, which has both a longer useful life and better scraping effect than the above-mentioned scraper blades according to prior art. Another object of the invention is to provide a scraper blade which, owing to its construction, maintains its scraping effect better and maintains the shape of the efficient scraper tip.

To summarize, the invention relates to a scraper blade which has at one end a scraper tip and at the other end a mounting base. The scraper tip is outwardly tapered. The scraper blade has at least two layers of different materials. In the invention, the layer of material adapted to form the actual scraper tip is made of a material that is both softer and more abrasion resistant than said at least one other layer. If the scraper blade has only two layers, the softer and more abrasion resistant layer will be facing forward, i.e. it will be the first to meet the surface to be scraped.

The characteristics of the invention are defined in the independent claim. The dependent claims define particularly preferred embodiments of the invention.

As mentioned above, the technique consisting in using a scraper with two layers of different hardness is already known from GB-A-1454763 in connection with scraping wet surfaces. In this case, two layers of material are used, one having a hardness of 75–98° Shore A and the other having a hardness of 65–88° Shore A. In the specification, it is stated that the scraper can be operated in both directions, i.e. either with the softer or with the harder layer of material first. This indicates that materials with similar or substantially similar abrasion resistance are used to obtain an even wear on both layers, which are arranged essentially perpendicularly to the scraped surface.

In the present invention, however, the harder material shall have a lower abrasion resistance in order to be worn faster and thus to permanently maintain a flexible scraper lip of a softer material in contact with the scraped surface.

Some examples of a scraper blade according to the present invention will be described in more detail with reference to the accompanying drawings.

FIGS. 4–12 illustrate further embodiments of the scraper blade according to the invention.

Figures 1, 3:
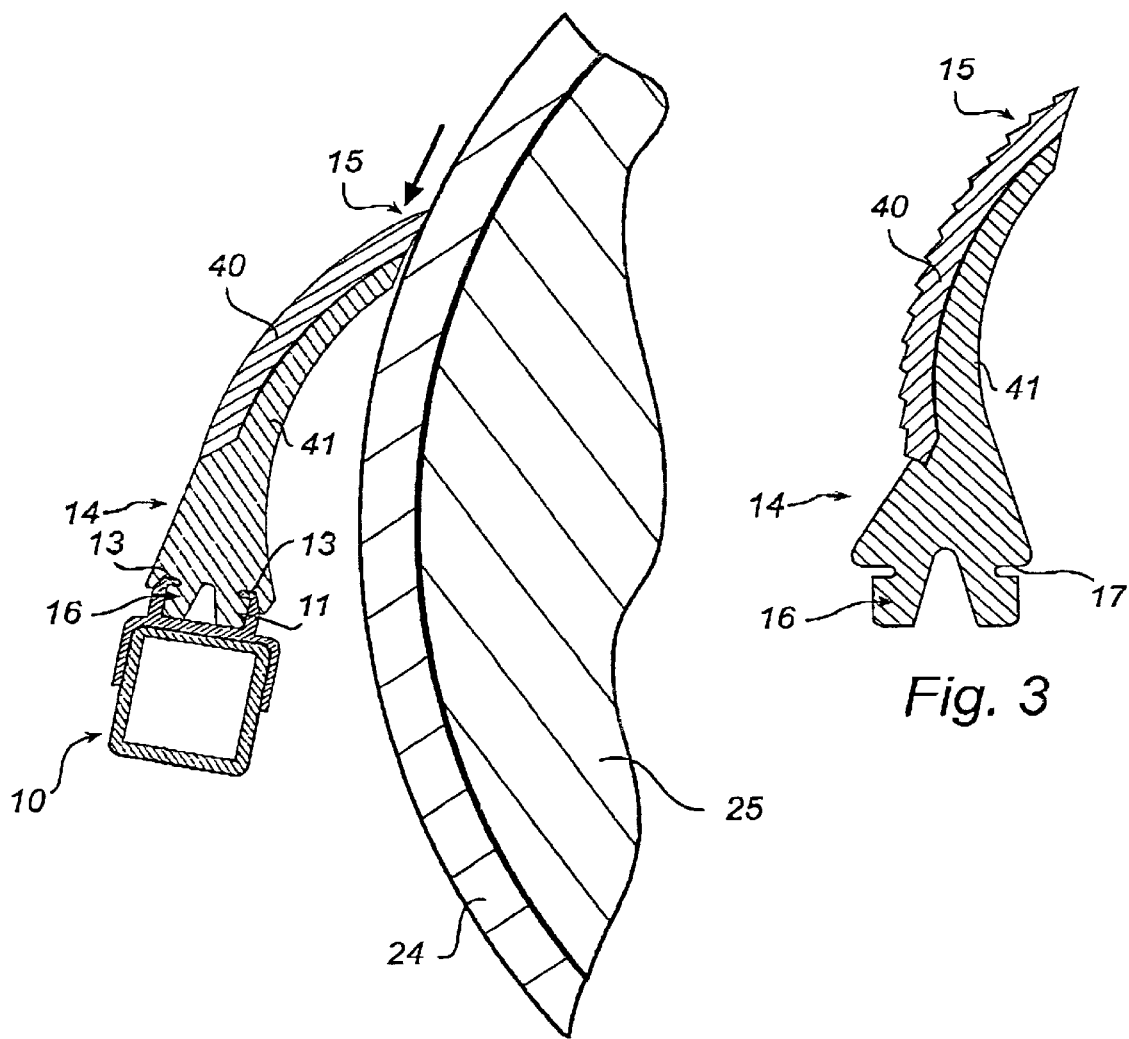
FIG. 1 shows a section through a conveyor belt scraper device with a first example of a scraper blade according to the invention.
FIG. 3 is an end view of a second example of a scraper blade according to the invention.
Figure 2:
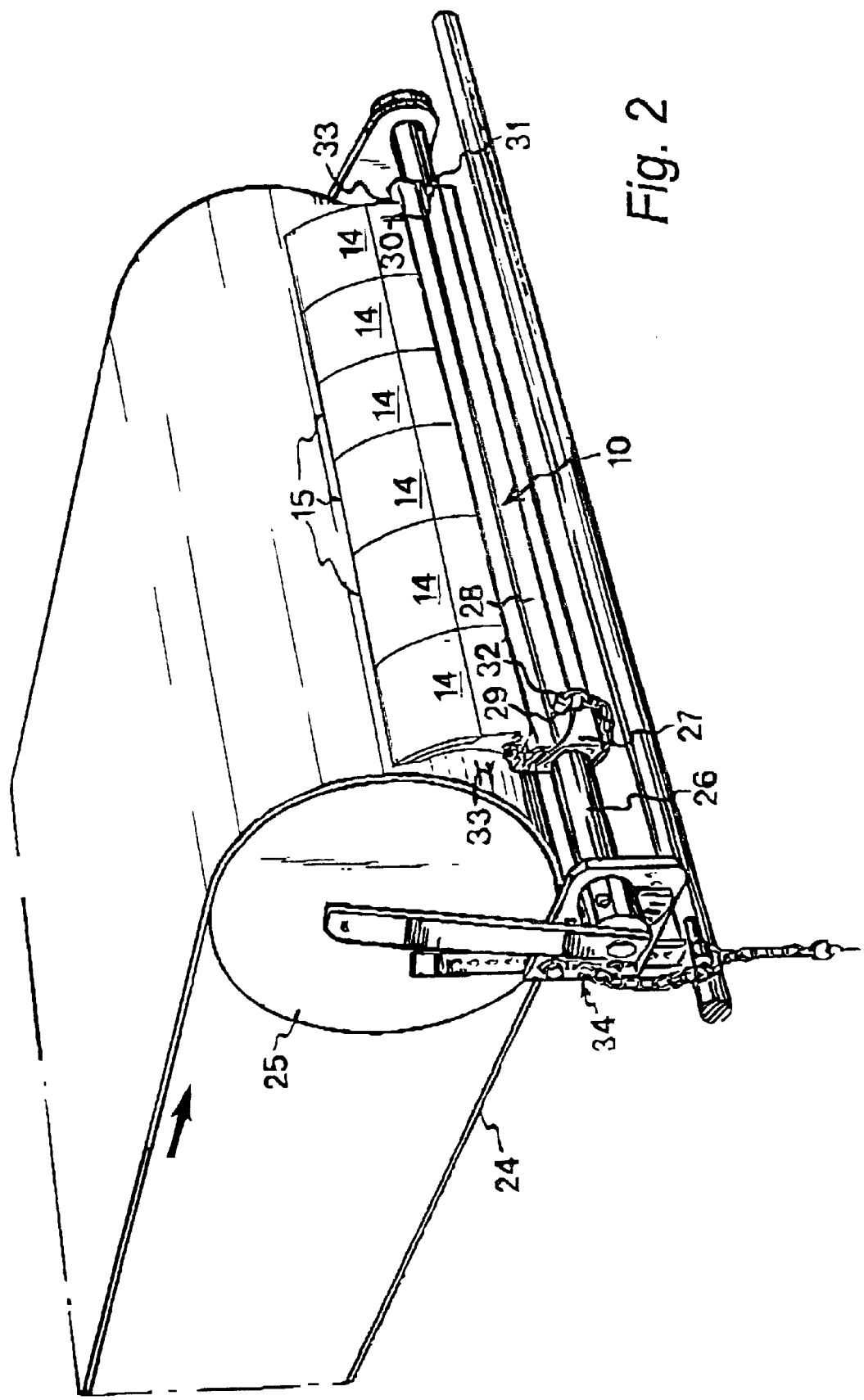
FIG. 2 is a perspective view of such a device.

The conveyor belt scraper device of FIGS. 1 and 2 is essentially designed in accordance with SE-B-468390 and the corresponding U.S. Pat. No. 4,874,304, which are incorporated herewith by reference. For the sake of simplicity, the same reference numerals are therefore used to indicate like components.

However, instead of the scraper blade/blades shown in said documents, a scraper blade according to the present invention is used.

In the example shown, the scraper blade 14 according to the present invention consists of two layers 40, 41 of material of different quality. As appears from the drawings, the scraper blade is adapted to be pressed at an oblique angle against the belt in the same way as indicated in most of the above-mentioned documents. The layer 40 which is turned away from the scraped surface of the conveyor belt 24 or which meets this surface first, is formed of an elastomeric or plastic quality that is soft and has a higher abrasion resistance. The layer 41 which is facing the scraped surface or which meets this surface last is formed of an elastomeric or plastic quality, which is harder than the material of the layer 40 and which has a higher abrasion resistance than this material.

In the scraper blade according to the invention, the harder and more rigid layer 41 serves as a stiffening layer to maintain the intended pressure acting against the belt when the scraper blade is flexibly pivoted towards and kept in engagement with the scraped surface. This layer is not adapted to be a scraping layer but only a stiffening layer.

However, a PU material with a high stiffness and a low abrasion resistance could be used as material in the more rigid layer. If PU materials are used, the hardness could preferably range from about 55° Shore D to about 75° Shore D. PVC, polyethylene, polyamide, polyester or the like could also be used as material in the layer 41. The scraper blade could also be designed as a laminate consisting of two or more sublayers, for example an abrasion resistant soft rubber layer 40 and a harder, less abrasion resistant layer 41 of polyethylene.

The layer 40 constitutes the actual scraping layer and forms the efficient scraper tip of the scraper blade. Advantageously, this layer has a hardness of about 50° Shore A to about 85° Shore A or, more preferred, from about 65° Shore A to about 85° Shore A.

By making the tip of a material that has a higher softness and a higher abrasion resistance than the material of the stiffening layer 41, the stiffening layer 41 will be exposed to intentional "excessive wear", i.e. it will wear faster than the layer 40. This has proven to give the scraper blade a substantially better scraping effect and a longer life.

Apart from the structure of the different layers of the scraper blade the example of a scraper blade shown is designed in prior-art manner. The mounting base 16 with its gripping grooves 17 (see FIG. 3) is designed in previously known manner to hold the supporting beam 10 designed according to prior art with its undercut mounting recess 11, which has inwardly directed flanges 13.

As appears from FIG. 1, the belt scraper device is mounted in such manner that the tip 15 of the scraper is pressed against the conveyor belt 24 as this passes around the belt drum 25, which rotates counter-clockwise in FIG. 1. The belt scraper can be urged against the conveyor belt in customary manner by means of devices which are not shown in more detail in FIG. 1 and which yieldingly urge the belt scraper against the conveyor belt, tending to displace the scraper tip 15 to the right in FIG. 1. These devices (not shown) may be pneumatic or hydraulic devices, spring devices or other mechanical devices. In the embodiment of FIG. 2, mechanical devices 34 are shown for pivoting and urging the belt scraper against the conveyor belt.

With reference to FIG. 2, the supporting element comprises two parts, namely a rotatable shaft 26 with a square tube 27 rigidly mounted thereon and a holder 28, which can be readily mounted on and dismounted from the square tube and in which the undercut mounting recess 11 is formed. The holder 28 with scraper blades mounted thereon may thus be easily and quickly mounted and dismounted as a single unit. In the present example, this can be achieved in that the holder 28 is provided at one end with holes 29 which, when the holder is mounted, are aligned with corresponding holes in the square tube 27, and further in that the holder at its other end has axially directed slots 30, which are formed in the flanges of the holder and in which, when the holder is mounted, protruding pins 31 on the square tube 27 engage. A cotter pin 32 inserted through the holes 29 and the corresponding holes in the square tube is also use for retaining the holder.

In the embodiment of FIG. 2 use is also made of set screws 33 which are screwed in the holder 28 and prevent unintentional displacement of the scraper blades 14 in the longitudinal direction of the holder 28.

The embodiment of FIG. 3 differs from the embodiment of FIGS. 1 and 2 in one respect only, namely that the outwardly directed side of the layer 40 has a stepped or saw-tooth shape. This shape reduces the risk of scraped-off material getting stuck on the outside of the scraper.

Moreover, the scraper blade tip is automatically renewed when the layer 40 at the tip 15 has been worn to form a new step. This is a considerable advantage in the case where the chosen quality of the material of the softer, more abrasion resistant layer should show a tendency to form a thin lip, which would reduce the performance of the scraper. A major advantage of this embodiment according to the invention, as compared with the prior-art scraper according to U.S. Pat. No. 4,658,949, is that the outside of the scraper is continuous and has no discontinuities that may weaken the construction. This makes the scraper more flexible and stable than the prior-art scraper, which is provided with cuts or slits in its outside that weaken the construction. Another advantage as compared with prior art is that the tip remains intact, i.e. its pointed shape is maintained. This is in opposition to the slit technique used in prior art, where a step is formed at the top of the scraper (See FIG. 4, U.S. Pat. No. 4,658,949)

In a comparison test involving scraper blades of varying construction, the scraper blades were used to scrape a conveyor belt transporting granite material having a grain size>0 to 250 mm. In the comparison test, use was made of a prior-art scraper blade made of a homogeneous urethane rubber material with a hardness of 90° Shore A and having exactly the same outer shape as the embodiment of the scraper blade according to the invention as shown in FIG. 1. Two different scraper blades according to the invention were used in the comparison test. One was formed according to FIG. 1, the layer 40 being made of an ester-based urethane rubber with a hardness of 70° Shore A and the layer 41 being made of an ester-based urethane rubber with a hardness of 65° Shore D. The other scraper blade used in the comparison test was formed according to FIG. 3, the layer 40 being made of an ester-based urethane rubber with a hardness of 70° Shore A and the layer 41 was made of an ester-based urethane rubber with a hardness of 65° Shore D. The results are presented below.

|  | Scraper type | | |
| --- | --- | --- | --- |
|  | one layer 90° Shore A | FIG. 1 two layers 65° Shore D/ 70° Shore A | FIG. 3 two layers 65° Shore D/ 70° Shore A |
| Total weight of new scraper (g) | 5694 | 5520 | 6000 |
| Total weight of worn scraper (g) | 4440 | 4955 | 5701 |
| Weight loss (g) | 1254 | 565 | 299 |
| Operation time (h) | 600 | 800 | 800 |
| Amount of stone material (tonnes) | 138000 | 200000 | 165000 |
| Weight loss per amount of material transported (g/tonnes) | 0.0091 | 0.0028 | 0.0018 |
| Abrasion index | 100 | 31 | 20 |

These practical tests clearly show that a scraper blade according to the present invention has about 3 times the life of a scraper having only one layer of material with the same hardness as the scraping layer 40 of the scraper according to the present invention. The reason for this presumably is that the efficient scraper tip of the layer 40 will function as a resilient scraper tip, which is well supported by the more rigid and less abrasion resistant layer 41 all the way to the outermost tip, and that the layer 41, as a result of its contact with irregularities on the conveyor belt or vibrations in the device, will always wear faster than the tip of the layer 40, but only to such an extent that a short resilient section of this tip is maintained, as is shown in FIG. 1.

The abrasion resistance of the different materials in this embodiment has been tested in accordance with ISO 4649 "Determination of abrasion resistance using a rotating cylindrical drum device", with a load of 10 N. In this test, the following abrasion values were observed:

| | |
|---|---|
| polyurethane 65° Shore D | 66 mm$^3$ |
| polyurethane 90° Shore A | 61 mm$^3$ |
| polyurethane 78° Shore A | 57 mm$^3$ |
| polyurethane 70° Shore A | 44 mm$^3$ |

As can be seen, the materials of a softer quality have a better abrasion resistance (i.e. a smaller amount of material is abraded) in this laboratory test. In field tests under actual conditions, the differences are considerably bigger. The reason that the laboratory test is not entirely correct is the method used for wearing the tip, i.e. by means of an abrasive paper, which becomes clogged quite easily by impurities from the abraded material.

The invention has been described in connection with urethane rubber of different quality in the scraper blade. In the invention, however, other materials may also be used as long as the actual scraping layer 40 is made of a soft, more abrasion resistant material and the supporting layer/layers 41 is/are made of harder and more rigid, but less abrasion resistant material. The material in the more rigid, less abrasion resistant layer could be, for example, PVC, polyethylene, polyamide, polyester or the like, as long as it is ensured that the material used has a lower abrasion resistance than the material in the actual scraping layer. The material in the actual scraping layer could be other materials than urethane rubber, for example suitable natural rubber compounds or other rubber materials, as long as it is ensured that the material in question is softer and has a better abrasion resistance than the material in the supporting layer 41.

Should the softer, more abrasion resistant material chosen for the actual scraping layer 40 prove to promote the formation of a thin lip, which would have a detrimental effect on the scraping result and the life of the scraper, the rear side of this layer could, according to a particularly preferred embodiment of the invention, be given a saw-tooth shape, as shown in FIG. 3 and as described above. It is also possible, however, within the scope of the invention, to counteract such tendencies of lip formation by using one of the embodiments shown in FIGS. 4–12.

Thus, in the embodiments of FIGS. 4–6, use is made of ribs 42, which are incorporated in the layer 40 in a spaced-apart manner and which extend parallel to the scraper blade tip 15. FIGS. 4–6 show three different cross-sections of these ribs 42. The ribs 42 could be made of the same material as the layer 41, i.e. a material with a lower abrasion resistance and a higher hardness than the material of the actual scraping layer 40. However, they could also be made of a third material which has a lower abrasion resistance than the material of the actual scraping layer 40 and which is brittle so as to break when the scraper blade tip has been worn to the rib 42 in question. In this way, any existing thin lip of the layer 40 will fall off so that the scraping effect remains unchanged.

Figure 9:
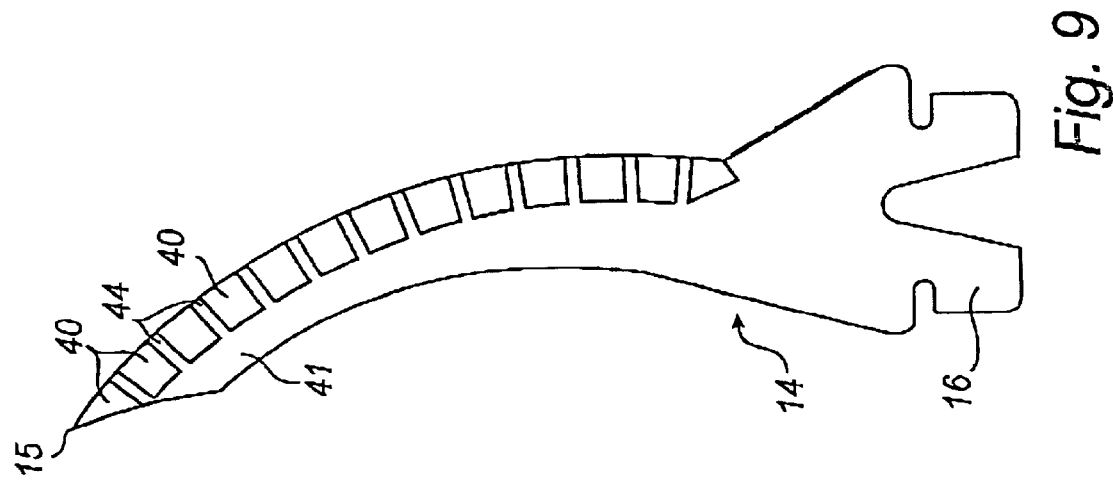
Figure 10:
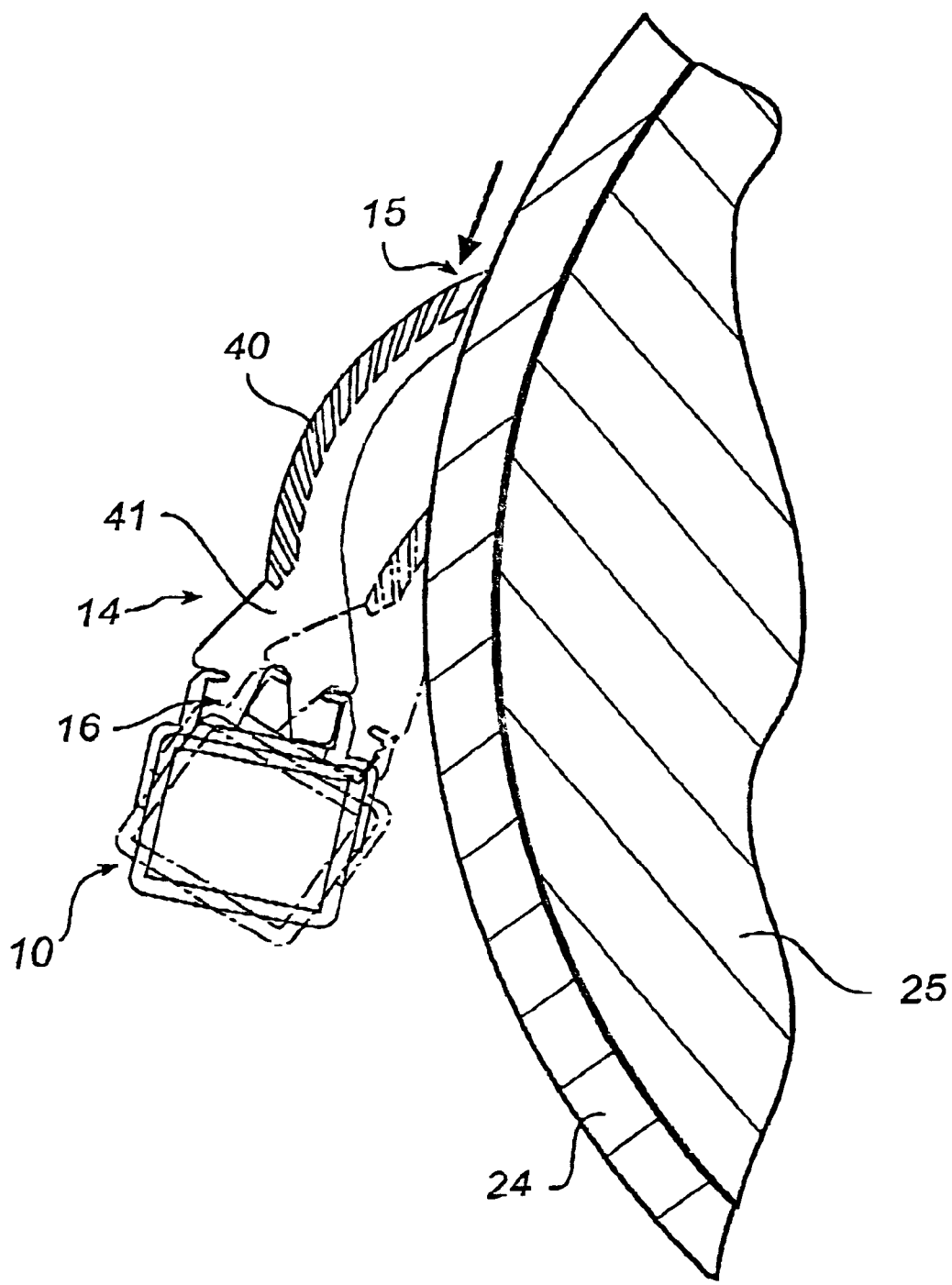

Another way to counteract the formation of a thin lip at the tip of the actual scraping layer 40 is to form the scraper blade from three different layers of material, where the actual scraping layer 40 is enclosed by layers 41 and 43 of a material having a lower abrasion resistance and a higher hardness than the material in the layer 40. FIG. 7 illustrates an embodiment in which the layer 43 is integrated with the layer 41 and is made of the same material as the latter and in which the layer 40 is thus enclosed by these two layers 41 and 43, except at the tip of the scraper. FIG. 8 illustrates an embodiment in which the layer 43 is a separate layer which has been laminated with the layer 40 and covers the rear side of said layer and which could be formed of another material than the layer 41, but which has a lower abrasion resistance and a higher hardness than the material of the layer 40 or is brittle and has a higher hardness than the material of the layer 40. A major advantage of these embodiments, where the layer which is adapted to form the actual scraper tip and which is made of a soft, more abrasion resistant material, is that any thin lip formed at the tip of the actual scraping layer 40 will automatically fall off when the tip has been worn to the third, outwardly facing layer 43. FIGS. 9–10 illustrate embodiments where the layer 41 has been provided with ribs 44 which extend through the layer 40 and are formed of the same material as the layer 41. The result is that the tip of the scraper blade is renewed when it has been worn to the ribs 44. The only difference between the embodiments according to FIGS. 9 and 10 is the way in which the ribs have been oriented and formed. In FIG. 9, they extend substantially perpendicularly to the layer 41, whereas the ribs 44 in FIG. 10 are arched in cross-section, the arch being adapted so that it will follow the curve of the scraped surface as the scraper is worn and gradually pivoted towards the scraped surface.

Figure 12:
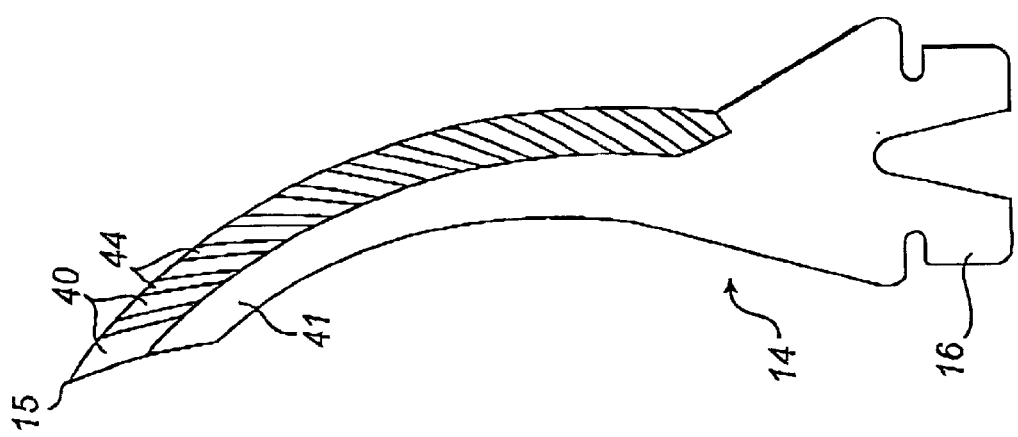
Figure 11:
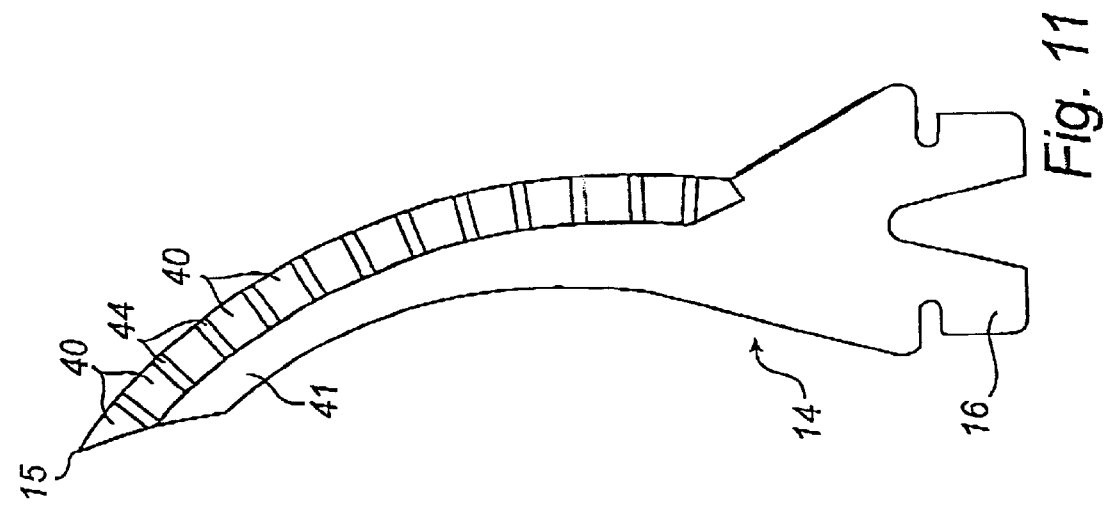

The embodiments according to FIGS. 11 and 12 correspond to the embodiments according to FIGS. 9 and 10, the difference being that the ribs 44 are formed as separate elements, which are attached to both the layer 41 and the different strips of the layer 40. However, the result is the same, i.e. as soon as the tip has been worn to the ribs 44, the remaining portions of the strip of the layer 40 will be broken off, so that the scraper tip always remains intact. In the embodiments of FIGS. 11 and 12, the same material may be chosen for the ribs 44 as for the layer 41, but, naturally, any other material that is less abrasion resistant than the layer 40 and harder than this layer, or brittle, may also be chosen.

What I claim and desire to secure by Letters Patent is:

1. A scraper blade, which has at one end a scraper tip for contacting a surface to be scraped and at an opposite end a mounting base and which is tapered towards the scraper tip at least in an outer end portion of the scraper blade, characterized in that a scraper blade portion, which extends from the tip to a place close to or adjacent to the mounting base, consists of at least two layers that extend to the scraper tip and that are made of different elastomeric or plastic materials, a support layer adapted to face the surface to be scraped during use of the scraper blade being made of a material with a higher hardness and a lower abrasion resistance than a scraper layer which is adapted to form a leading edge of the scraper tip and which, during use of the scraper blade, is located outside said support layer relative to the surface to be scraped.

2. A scraper blade according to claim 1, characterized in that the layers of the scraper blade are made of urethane rubber.

3. A scraper blade according to claim 1, characterized in that its tip is bevelled to be pressed against the surface to be scraped at an oblique angle in such manner that an outer portion of the tip of the scraper blade is formed exclusively by the softer, more abrasion resistant layer.

4. A scraper blade according to claim 1, characterized in that the softer material has a hardness from 50° Shore A, preferably 65° Shore A, to 85° Shore A, and that the harder material has a hardness from 55° Shore D to 75° Shore D.

5. A scraper blade according to claim 4, characterized in that the softer material has a hardness of about 70° Shore A.

6. A scraper blade according to claim 4, characterized in that the softer material has a hardness of about 78° Shore A.

7. A scraper blade according to claim 1, characterized in that the harder material has a hardness of about 65° Shore D.

8. A scraper blade according to claim 1, characterized in that its scraper blade portion consists of at least two layers, and that the layer which is adapted to form the actual scraper tip during use of the scraper blade and which is located farthest away from the surface to be scraped, has an outer surface of a stepped or saw-tooth shape.

9. A scraper blade according to claim 1, characterized in that the layer adapted to form the actual scraper tip during use of the scraper blade is laminated between two layers, which are made of a material with a lower abrasion resistance and a higher hardness than the material of the layer adapted to form the actual scraper tip.

10. A scraper blade according to claim 1, characterized in that its scraper blade portion comprises three layers, of which the layer adapted to form the actual scraper tip during use of the scraper blade is laminated between two layers, of which the layer adapted to face the surface to be scraped during use of the scraper blade is made of a material with a lower abrasion resistance and a higher hardness than the material of the layer adapted to form the actual scraper tip, and of which the layer adapted to be located farthest away from the surface to be scraped during use of the scraper blade is made of a material which either has a lower abrasion resistance and a higher hardness than he material of the actual scraper tip or is brittle and has a lower abrasion resistance than the material of the actual scraper tip.

11. A scraper blade according to claim 1, characterized in that the layer adapted to face the surface to be scraped during use of the scraper blade has ribs which extend outwards from this layer and between which the layer of softer, more abrasion resistant material is located.

12. A scraper blade according to claim 11, characterized in that the ribs are made in one piece with the layer adapted to face the surface to be scraped during use of the scraper blade.

13. A scraper blade according to claim 11, characterized in that the ribs are made of another material than the layer adapted to face the surface to be scraped during use of the scraper blade, and that the ribs are made of a harder and less abrasion resistant material than the material of the layer made of softer, more abrasion resistant material.

14. A scraper blade according to claim 11, characterized in that the ribs are made of another material than the layer adapted to face the surface to be scraped during use of the scraper blade, and that the material of which the ribs are made is brittle and less abrasion resistant than the material of the layer adapted to form the actual scraper tip.

15. A scraper blade according to claim 11, characterized in that the ribs are arcuate in shape.

16. A scraper blade having a mounting base on a first end and a scraper tip on a second end, the scraper blade being tapered from the mounting base toward the scraper tip at least on a leading edge of the scraper blade, the scraper blade comprising:

a scraping element extending from the scraper tip to a location proximate to the mounting base, the scraping element formed from a first elastomeric or plastic material; and a support element extending from the scraper tip to the mounting base, the support element formed from a second elastomeric or plastic material with a higher hardness and a lower abrasion resistance than the first elastomeric or plastic material.

17. The scraper blade of claim 16 wherein the scraper tip is bevelled to be pressed against a surface to be scraped at an oblique angle such that the leading edge of the scraper tip is formed exclusively by the first elastomeric or plastic material.

18. An elongate scraper having a mounting base and a scraper end face, the elongate scraper for contacting a surface to be scraped, the elongate scraper comprising:

a supporting element extending from the mounting base to the scraper end face of the elongate scraper, the supporting element formed from a first material; and a scraping element extending from a location on the elongate scraper that is near the mounting base to the scraper end face, the scraping element providing a leading edge of the scraper end face, the scraping element formed from a second material with a lower hardness and a higher abrasion resistance than the first material;

wherein the supporting element provides a trailing edge of the scraper end face.

19. The elongate scraper of claim 18 wherein the first material and the second material are selected from a group consisting of plastics, elastomeric materials, and urethane rubber.

20. The elongate scraper of claim 18 wherein during use, the supporting element is located closer to a surface to be scraped than the scraping element.

* * * * *

UNITED STATES PATENT AND TRADEMARK OFFICE
CERTIFICATE OF CORRECTION

PATENT NO.     : 6,619,469 B2
DATED          : September 16, 2003
INVENTOR(S)    : Mats Anders Malmberg It is certified that error appears in the above-identified patent and that said Letters Patent is hereby corrected as shown below:

<u>Title page,</u>
Item [56], References Cited, U.S. PATENT DOCUMENTS, "6,082,524" delete "7/2000" and insert -- 6/2000 --

Signed and Sealed this

Fourth Day of May, 2004

JON W. DUDAS
*Acting Director of the United States Patent and Trademark Office*